United States Patent
Zhu et al.

(10) Patent No.: US 8,208,080 B2
(45) Date of Patent: Jun. 26, 2012

(54) LIQUID CRYSTAL DISPLAY

(75) Inventors: Xinyu Zhu, Orlando, FL (US); Zhibing Ge, Orlando, FL (US); Shin-Tson Wu, Orlando, FL (US); Wang-Yang Li, Tainan County (TW); Chung-Kuang Wei, Taipei (TW)

(73) Assignees: Chimei Innolux Corporation, Miao-Li County (TW); University of Central Florida Research Foundation, Inc., Orlando, FL (US)

( * ) Notice: Subject to any disclaimer, the term of this patent is extended or adjusted under 35 U.S.C. 154(b) by 594 days.

(21) Appl. No.: 11/683,206

(22) Filed: Mar. 7, 2007

(65) Prior Publication Data

US 2008/0218645 A1 Sep. 11, 2008

(51) Int. Cl.
*G02F 1/1333* (2006.01)
*G02F 1/1343* (2006.01)

(52) U.S. Cl. .......................... 349/33; 349/143

(58) Field of Classification Search .................. 349/33, 349/34, 114, 139, 141, 143, 38, 39, 115, 349/123
See application file for complete search history.

(56) References Cited

U.S. PATENT DOCUMENTS

| | | | | |
|---|---|---|---|---|
| 4,257,682 A * | 3/1981 | Suzuki et al. | ................ | 349/130 |
| 6,151,093 A * | 11/2000 | Takiguchi et al. | ............ | 349/172 |
| 6,327,013 B1 * | 12/2001 | Tombling et al. | ............ | 349/139 |
| 6,424,396 B1 | 7/2002 | Kim et al. | | |
| 6,661,488 B1 | 12/2003 | Takeda et al. | | |
| 6,710,825 B2 | 3/2004 | Kubo et al. | | |
| 6,768,530 B2 * | 7/2004 | Matsuyama et al. | .......... | 349/123 |
| 6,850,301 B2 * | 2/2005 | Shimoshikiryo | ............. | 349/129 |
| 7,088,413 B2 * | 8/2006 | Martinot-Lagarde et al. | ............................. | 349/129 |
| 7,274,348 B2 * | 9/2007 | Izumi et al. | ..................... | 345/87 |
| 7,295,272 B2 * | 11/2007 | Helgee et al. | ................. | 349/123 |
| 7,355,664 B2 * | 4/2008 | Ogishima et al. | ............. | 349/129 |
| 7,586,559 B2 * | 9/2009 | Minoura et al. | ................ | 349/62 |
| 8,045,115 B2 * | 10/2011 | Lee et al. | ...................... | 349/133 |
| 8,107,025 B2 * | 1/2012 | Shimizu et al. | ................. | 349/33 |

(Continued)

FOREIGN PATENT DOCUMENTS

CN 1338655 A 3/2002

(Continued)

OTHER PUBLICATIONS

Office Action, Taiwanese Patent Application 097100752, 13 pages, Nov. 25, 2011.

(Continued)

*Primary Examiner* — Akm Ullah
(74) *Attorney, Agent, or Firm* — Thomas|Kayden

(57) ABSTRACT

A display includes pixel circuits, each pixel circuit including a first electrode, a second electrode, a third electrode, and a liquid crystal layer doped with a chiral material. The first electric is electrically coupled to a first reference voltage. The second electrode receives a pixel voltage corresponding to a gray scale level, the second electrode including a conducting layer having openings. The third electrode is electrically coupled to a second reference voltage. The second electrode is between the first and third electrodes, and the liquid crystal layer is between the first and second electrodes.

22 Claims, 14 Drawing Sheets

U.S. PATENT DOCUMENTS

| | | | |
|---|---|---|---|
| 2001/0048499 A1* | 12/2001 | Numano et al. | 349/123 |
| 2003/0206260 A1* | 11/2003 | Kobayashi et al. | 349/115 |
| 2004/0201816 A1 | 10/2004 | Chen et al. | 349/175 |
| 2004/0233365 A1* | 11/2004 | Yoshida et al. | 349/123 |
| 2005/0213002 A1* | 9/2005 | Wen et al. | 349/114 |
| 2006/0164585 A1 | 7/2006 | Shih | |

FOREIGN PATENT DOCUMENTS

| | | |
|---|---|---|
| JP | 2006-251161 A | 9/2009 |
| TW | 200420985 | 10/2004 |
| TW | 200528778 | 9/2005 |

OTHER PUBLICATIONS

K. H. Kim, et al. "Domain divided vertical alignment mode with optimized fringe field effect" Proceeding of the 18th International Display Research Conference (Asia Display'98), pp. 383-386, 1998.

Y. Ishii, et al. "High Performance TFT-LCDs for AVC Applications" SID'01, Digest, 41.1 (2001).

Y. Kume, et al. "Advanced ASM Mode (Axially Symmetric Aligned Microcell Mode): Improvement of Display Performances by Using Negative Dielectric Liquid Crystal" SID'98, 41.4 (1998).

* cited by examiner

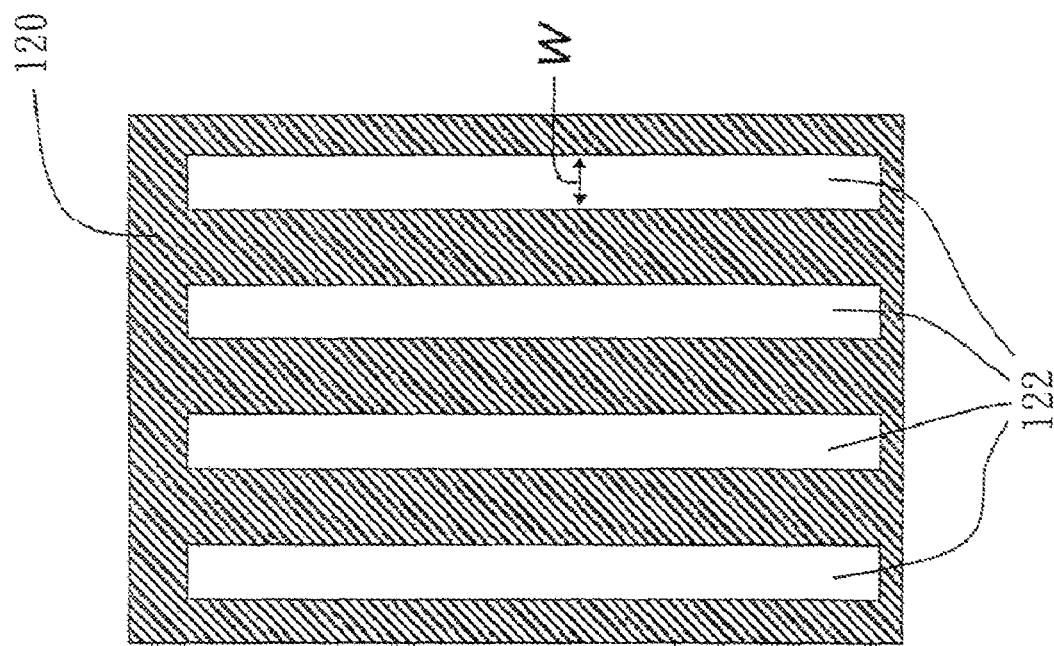

LIQUID CRYSTAL DISPLAY

PARTIES TO A JOINT RESEARCH AGREEMENT

The subject matter disclosed in this patent application was developed under a joint research agreement between Chi Mei Optoelectronics and the University of Central Florida.

BACKGROUND OF THE INVENTION

This description relates to liquid crystal displays.

Liquid crystal displays (LCDs) can be used in many electronic devices, such as cell phones, personal digital assistants, laptop computers, desktop monitors, and flat panel televisions. For example, a liquid crystal display has a liquid crystal layer positioned between two crossed linear polarizers for modulating light using an electro-optic effect. A voltage applied to the liquid crystal layer changes the orientations of the liquid crystal molecules and the optical phase retardation of the liquid crystal layer, thereby changing the amount of light that passes the crossed linear polarizers. The liquid crystal display has an array of pixel circuits that can be individually addressed. The pixel circuits modulate light according to pixel data (pixel voltages), thereby generating images. Each pixel of the display can show a range of gray scale levels depending on the voltage applied to the liquid crystal layer. Use of color filters allows the display to show color images.

SUMMARY

In one aspect, in general, a display includes pixel circuits, each pixel circuit including a first electrode to be electrically coupled to a first reference voltage, a second electrode to receive a pixel voltage corresponding to a gray scale level, the second electrode includes a conducting layer having openings, a third electrode to be electrically coupled to a second reference voltage, the second electrode being between the first and third electrodes, and a liquid crystal layer between the first and second electrodes, the liquid crystal layer being doped with a chiral material.

Implementations of the display may include one or more of the following features. The first reference voltage is equal to the second reference voltage. The first and second reference voltages are equal to a ground voltage of the pixels. The chiral material is selected to cause the liquid crystal layer to form twisted structures each having a free pitch of at least ten times a thickness of the liquid crystal layer. The first, second, and third electrodes and the chiral dopant are configured such that when the pixel voltage is applied to the second electrode, an electric field generated by the first, second, and third electrodes cause liquid crystal molecules above the openings to tilt by amounts that are more than half of those of the liquid crystal molecules above the conducting layer away from the openings, the amount of tilt being measured from initial positions of the molecules when the pixel voltage is below a threshold.

In some examples, when the pixel circuit is in a bright state, the transmissivity of portions of the pixel corresponding to the openings is at least half the transmissivity of portions of the pixel corresponding to the conducting layer away from the openings. In some examples, when the pixel circuit is in a bright state, the transmissivity of portions of the pixel corresponding to the openings is at least 90% the transmissivity of portions of the pixel corresponding to the conducting layer away from the openings. The first, second, and third electrodes and the chiral dopant are configured such that azimuth angles of liquid crystal directors vary continuously across the pixel when the pixel voltage is applied to the second electrode. The liquid crystal layer includes liquid crystal molecules that are aligned along a direction substantially normal to the surfaces of the first and second electrodes when the pixel voltage is below a threshold.

In some examples, the openings include circles having diameters in a range between 0.1 µm to 8 µm. In some examples, the openings include elongated slits each having a width in a range between 0.1 µm to 8 µm. The elongated slits have at least one of straight, curved, and piecewise linear shapes. In some examples, the third electrode includes a continuous conducting layer without openings. In some examples, the third electrode includes a conducting layer having openings. The conducting layer includes portions having shapes that correspond to the shapes of the openings of the second electrode. The second and third electrodes are configured such that liquid crystal molecules adjacent to the openings are subject to electric fields having directions from the liquid crystal layer to the third electrode. The first, second, and third electrodes are configured such that liquid crystal molecules farther away from the openings are subject to electric fields having directions from the second electrode to the first electrode.

The display includes an alignment film between the liquid crystal layer and the second electrode. The display includes an alignment film between the liquid crystal layer and the first electrode. Each pixel includes a storage capacitor having terminals that include portions of the second electrode and the third electrode. The first electrodes of different pixels are electrically connected. The third electrodes of different pixels are electrically connected. The display includes a first circular polarizer and a second circular polarizer, the liquid crystal layer being between the first and second circular polarizers. The display includes a first linear polarizer and a second linear polarizer, the liquid crystal layer being between the first and second linear polarizers.

In another aspect, in general, a display includes a first substrate, a second substrate, and pixel circuits between the first and second substrates. Each pixel circuit includes a first electrode to be electrically coupled to a ground reference voltage, a second electrode to receive a pixel voltage corresponding to a gray scale level, the second electrode includes a conducting layer having openings, a third electrode to be electrically coupled to the ground reference voltage, the second electrode being between the first and third electrodes, and a liquid crystal layer between the first and second electrodes. The display includes a first alignment layer between the liquid crystal layer and the first electrode of each pixel circuit, and a second alignment layer between the liquid crystal layer and the second electrode of each pixel circuit.

Implementations of the display may include one or more of the following features. The liquid crystal layer includes a chiral material.

In another aspect, in general, a method includes generating an electric field in a liquid crystal layer of a pixel circuit of a display, the electric field causing liquid crystal molecules in the liquid crystal layer to tilt from initial positions, the electric field having a distribution such that the liquid crystal layer forms a continuous domain in which the liquid crystal molecules at different locations tilt in different directions, and the tilt directions of the liquid crystal molecules vary continuously across the pixel circuit. The method includes providing a twisting force to the liquid crystal molecules to cause the liquid crystal molecules to tilt at along different azimuth angles across the pixel.

Implementations of the method may include one or more of the following features. Providing a twisting force includes using chiral dopants in the liquid crystal layer to provide the twisting force. Generating the electric field includes providing a first reference voltage to a first electrode, providing a pixel voltage to a second electrode, and providing a second reference voltage to a third electrode, the liquid crystal layer being between the first and second electrodes, the second electrode being between the first and third electrodes, the second electrode includes a conducting layer having openings. The method includes tilting the liquid crystal molecules above the openings by amounts that are more than half of those of the liquid crystal molecules above the conducting layer away from the openings. The method includes providing a substantially uniform transmittance across the pixel upon application of the pixel voltage, the transmittance of portions of the pixel corresponding to the openings being more than half of the transmittance of portions of the pixel corresponding to the conducting layer away from the openings. The method includes aligning liquid crystal molecules of the liquid crystal layer along directions substantially normal to substrates at two sides of the liquid crystal layer prior to generating the electric field.

In another aspect, in general, a method includes forming a first electrode on a first substrate, forming a third electrode on a second substrate, forming an insulation layer on the third electrode, forming a second electrode on the insulation layer, the second electrode includes a conducting layer having openings, positioning the first substrate parallel to and at a distance to the second substrate, and providing a liquid crystal layer between the first and second electrodes.

Implementations of the method may include one or more of the following features. The method includes adding a chiral material to the liquid crystal material of the liquid crystal layer. Adding the chiral material includes adding a chiral material having a concentration selected to cause the liquid crystal layer to form a twisted structure having a free pitch of at least ten times a thickness of the liquid crystal layer.

Advantages of the liquid crystal displays can include one or more of the following. The display can have a high light efficiency. The display can have wide viewing angle in which there is low color shift when viewing from oblique viewing directions.

DESCRIPTION OF DRAWINGS

FIGS. 2A-2C are diagrams of patterned ITO layers.

DETAILED DESCRIPTION

Figure 1:
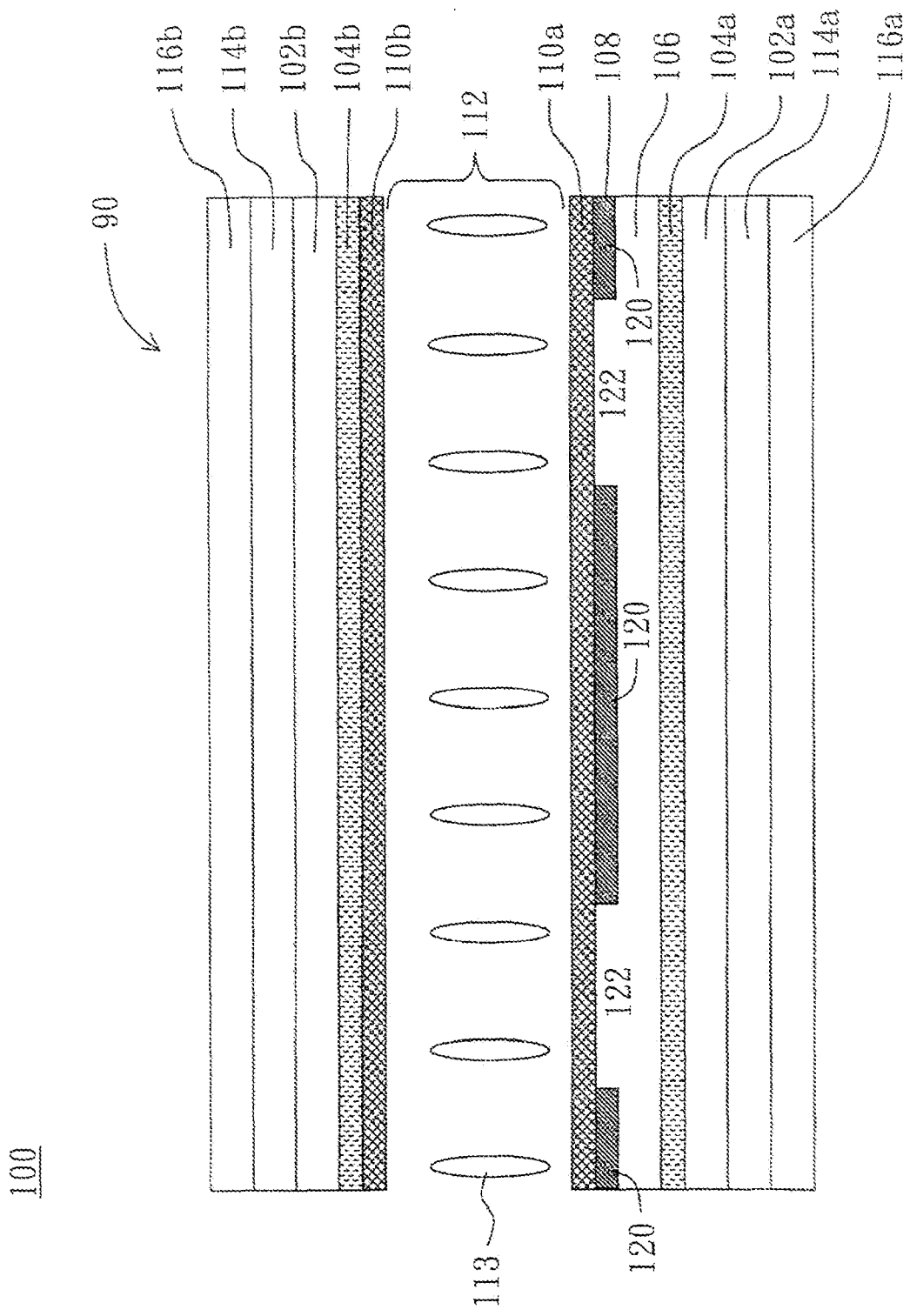
FIG. 1 is a cross-sectional diagram of a pixel.

FIG. 1 is a cross-sectional diagram of an example of a pixel 90 of a vertical alignment mode liquid crystal display 100 that includes a first transparent substrate 102a coated with an indium tin oxide (ITO) layer 104a, a non-conductive planar layer 106, a patterned ITO layer 108, and a first vertical alignment film 110a. The patterned ITO layer 108 has a shape that extends over only a portion of the pixel 90. The display 100 includes a second transparent substrate 102b coated with an ITO layer 104b and a second vertical alignment film 110b. A negative dielectric anisotropic nematic liquid crystal layer 112, doped with a chiral material, is positioned between the first vertical alignment film 110a and the second vertical alignment film 110b. When no voltage is applied across the liquid crystal layer 112, liquid crystal molecules 113 in the layer 112 are aligned substantially normal to the surfaces of the substrates 102a and 102b.

A first phase retardation film 114a and a first linear polarizer 116a are laminated on an outer surface of the first substrate 102a. The phase retardation film 114a can be, e.g., a chromatic quarter-wave film or a broadband quarter-wave film, so that the combination of the phase retardation film 114a and the linear polarizer 116a forms a circular polarizer. A second phase retardation film 114b and a second linear polarizer 116b are laminated on an outer surface of the second substrate 102b. Similarly, the phase retardation film 114b can be, e.g., a chromatic quarter-wave film or a broadband quarter-wave film so that the combination of the phase retardation film 114b and the linear polarizer 116b forms a circular polarizer. The display 100 can include a color filter layer (not shown) that is placed between the second substrate 102b and the second alignment film 110b, allowing the display 100 to show color images. The color filter can also be placed between the first substrate 102a and the first alignment film 110a.

Figure 9:
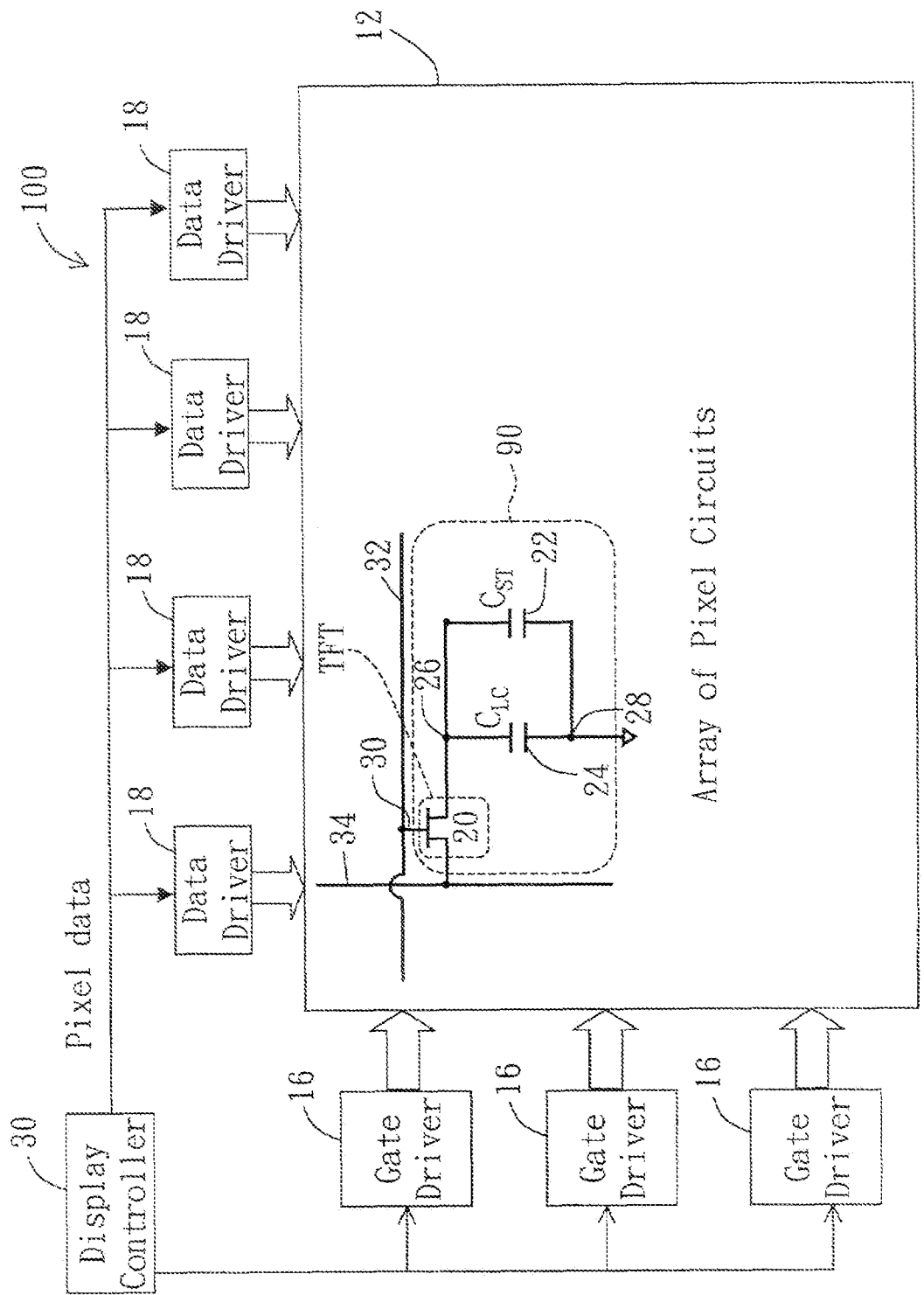
FIG. 9 is a schematic diagram of a liquid crystal display, showing driving circuits of the display.

The patterned ITO layer 108 functions as a pixel electrode and is connected to a thin-film-transistor (TFT) switch 20 and a storage capacitor $C_{ST}$ 22 (FIG. 9). The ITO layer 104a on the first substrate 102a functions as a first common electrode. The ITO layer 104a of different pixels can be electrically connected. For example, the ITO layer 104a can be a continuous layer on the first substrate 102a that extends across all of the pixels. The ITO layer 104b on the second substrate 102b functions as a second common electrode. For example, the ITO layer 104b can be a continuous layer on the second substrate 102b that extends across all of the pixels. The first common electrode (ITO layer 104a) and the second common electrode (ITO layer 104b) can both be connected to a ground voltage.

The ITO layer 108, ITO layer 104a, and ITO layer 104b will also be referred to as the pixel electrode 108, the first common electrode 104a, and the second common electrode 104b, respectively. The pixel electrode 108, the common electrodes 104a, 104b, the liquid crystal layer 112, the thin film transistor 20, and the storage capacitor $C_{ST}$ 22 of a pixel are collectively referred to as a pixel circuit.

As described below, the pixel electrode 108, the first common electrode 104a, and the second common electrode 104b are configured to generated electric fields having a distribution that, in combination with a twisting effect caused by the chiral dopants, facilitates the formation of a continuous domain in the liquid crystal layer 112 of the pixel 90. The liquid crystal molecules 113 at different locations in the liquid crystal layer 112 tilt in different directions that vary continuously across the pixel 90. This increases the viewing angle of the display 100 because light traveling at different angles through the liquid crystal layer 112 will experience similar phase retardation.

The substrates 102a and 102b can be made of, e.g., glass. The non-conductive planar layer 106 can be made of, e.g., silicon dioxide ($SiO_2$) or silicon nitride ($SiN_x$). The first and second alignment films 110a and 110b can be made of, e.g., polyimide materials. The first and second phase retardation films 114a and 114b can be made of, e.g., polycarbonate or polyvinyl alcohol (PVA). The first and second linear polarizers 116a and 116b can be, e.g., linearly oriented polyvinyl alcohol (PVA) film with iodine solution imbibitions.

Figure 2A:
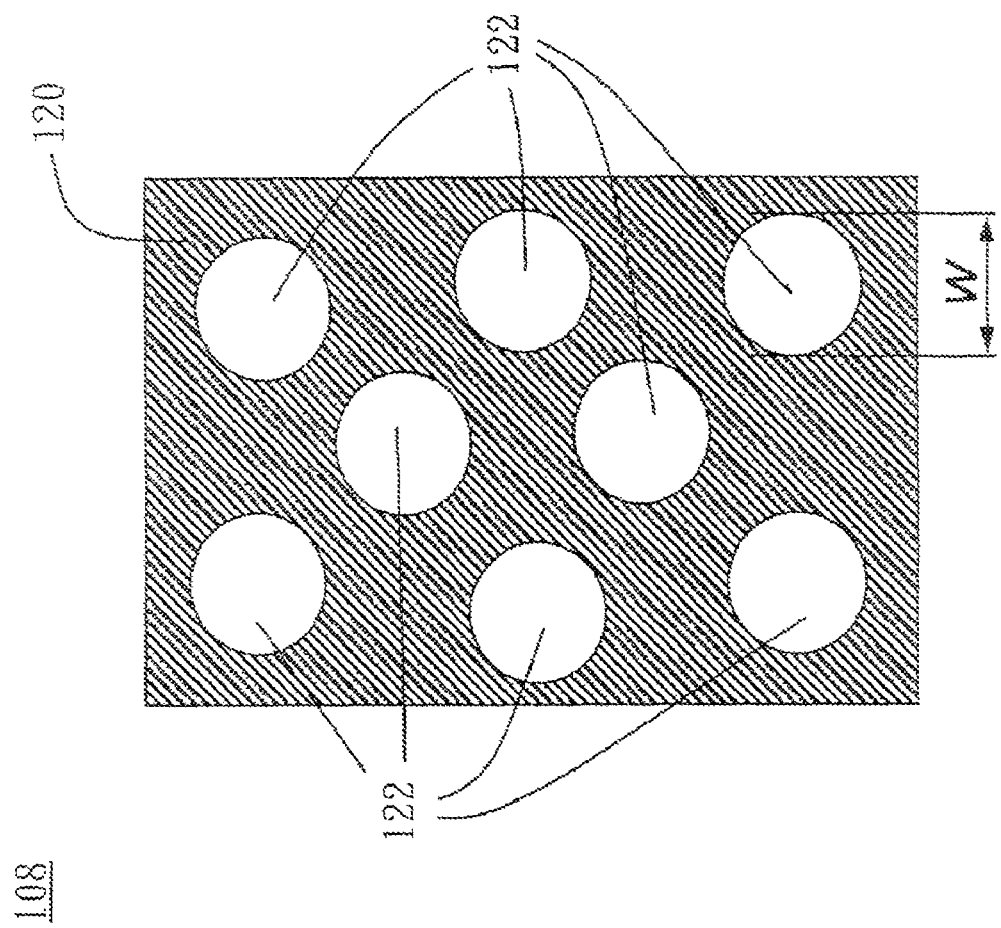

FIG. 2A is a diagram of a first example of the patterned ITO layer 108. The patterned ITO layer 108 has a conductive portion 120 made of indium-tin-oxide, and openings 122. The openings 122 can be formed by etching away a portion of the INDIUM TIN OXIDE in the layer 108. In this example, the openings 122 have circular shapes each having a diameter W in a range between 0.1 μm to 8 μm.

Figure 2B:
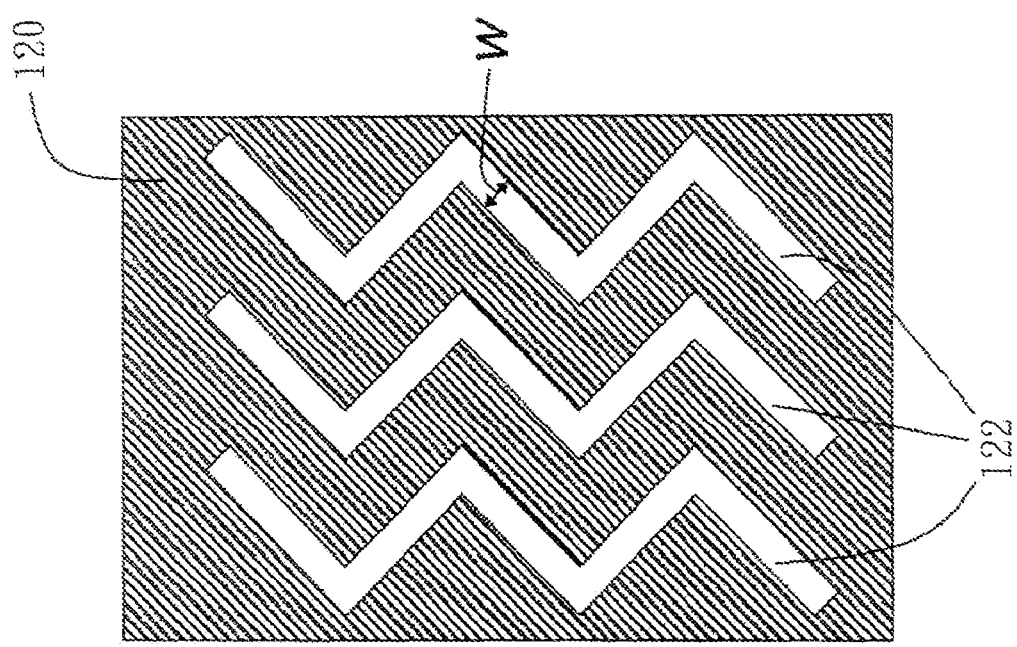

FIG. 2B is a diagram of a second example of the patterned ITO layer 108, which includes a conductive portion 120 made of indium tin oxide, and openings 122. In this example, the openings 122 have piecewise linear, chevron-like shapes. The gap width W of each opening 122 can be in a range between 0.1 μm to 8 μm.

FIG. 2C is a diagram of a third example of the patterned ITO layer 108, which includes a conductive portion 120 made of indium tin oxide, and openings 122. In this example, the openings 122 have long rectangular shapes. The gap width W of the opening 122 can be in a range between 0.1 μm to 8 μm.

Figure 3:
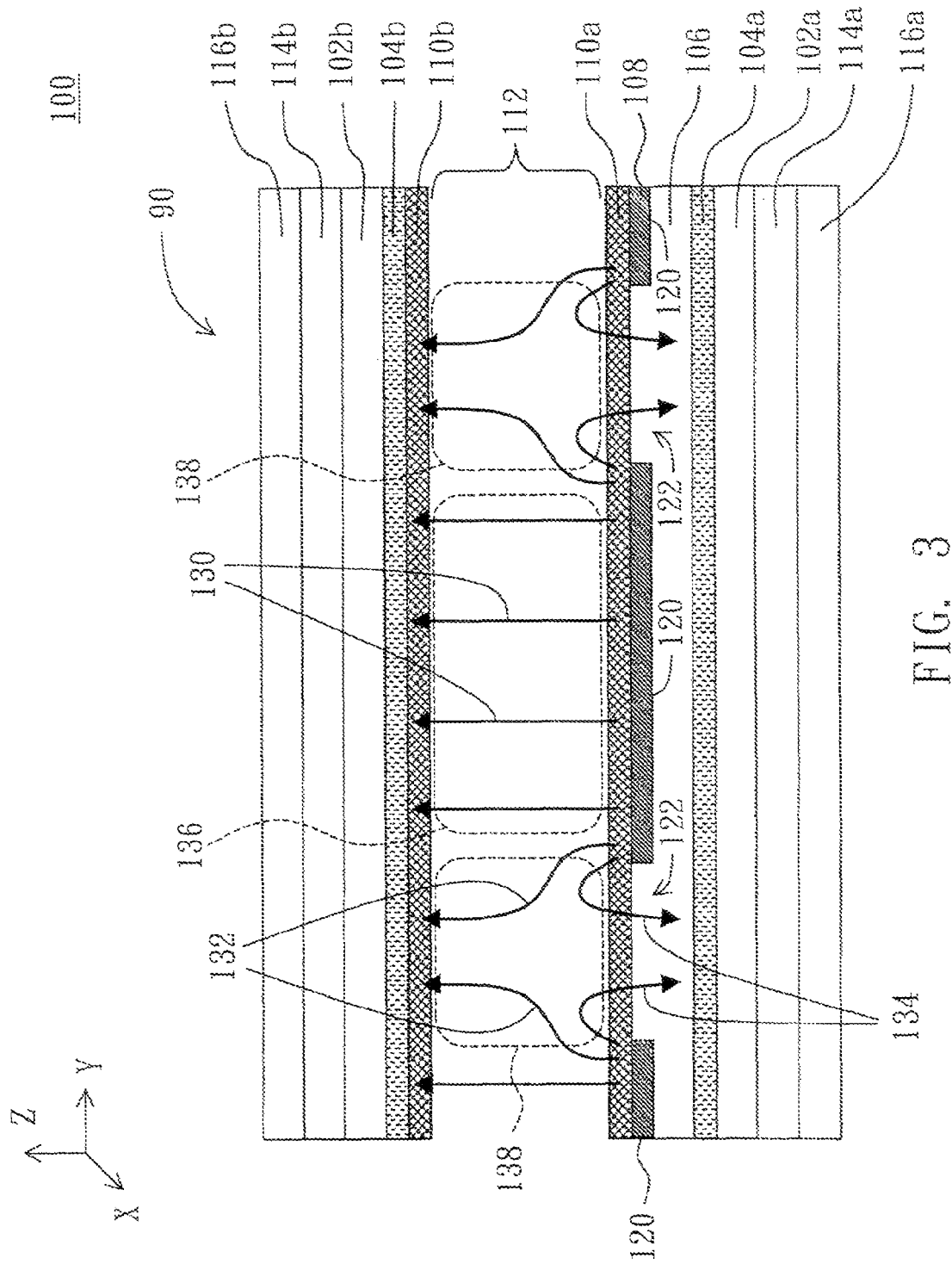
FIG. 3 is a cross-sectional diagram of a pixel, showing an electric field distribution at the pixel.

FIG. 3 is a cross-sectional diagram of the pixel 90, showing electric field lines at a voltage-on state. The voltage-on state refers to a condition in which a pixel voltage is applied to the pixel electrode 108, such that electric fields are generated in the regions between the pixel electrode 108 and the first common electrode 104a, and in the regions between the pixel electrode 108 and the second common electrode 104b.

As described below, the pixel electrode 108, the first common electrode 104a, and the second common electrode 104b are configured to generated electric fields having a distribution that facilitates rotation of liquid crystal molecules 113 so that that the amount of tilt of the liquid crystal molecules 113 above the openings 122 are comparable to the amount of tilt of the liquid crystal molecules 113 above the conductive portion 120. The transmissivities of the portion of the liquid crystal layer 112 above the openings 122 are comparable to those above the conductive portion 120. This increases the overall light efficiency of the pixel 90, resulting in a brighter pixel for a given amount of backlight.

The electric field in the liquid crystal layer is a function of position within the liquid crystal layer 112. A Cartesian coordinate system having x, y, and z axes is used as a reference for describing the orientations of the components of the display 100. In this example, the z-axis is selected to be perpendicular to the surfaces of the substrates 102a and 102b. The x-axis and the y-axis are parallel to the surfaces of the substrates 102a and 102b.

The electric field in the liquid crystal layer 112 includes a "longitudinal electric field" 130 at a region 136 above the conductive portion 120 of the pixel electrode 108, and "fringe electric fields" 132 and 134 at a region 138 above the opening 122 of the pixel electrode 108. In the longitudinal electric field 130, the electric field lines are substantially parallel to the z-axis. In the fringe electric field 132, the electric field lines generally extend from the pixel electrode 108 toward the second common electrode 104b along directions that are not parallel to the z-axis (except near the electrodes 108 and 104b). In the fringe electric field 134, the electric field lines generally extend from the pixel electrode 108 partially into the liquid crystal layer 112, then turn toward the opening 122, pass the opening 122, and end at the first common electrode 104a.

Figure 4A:
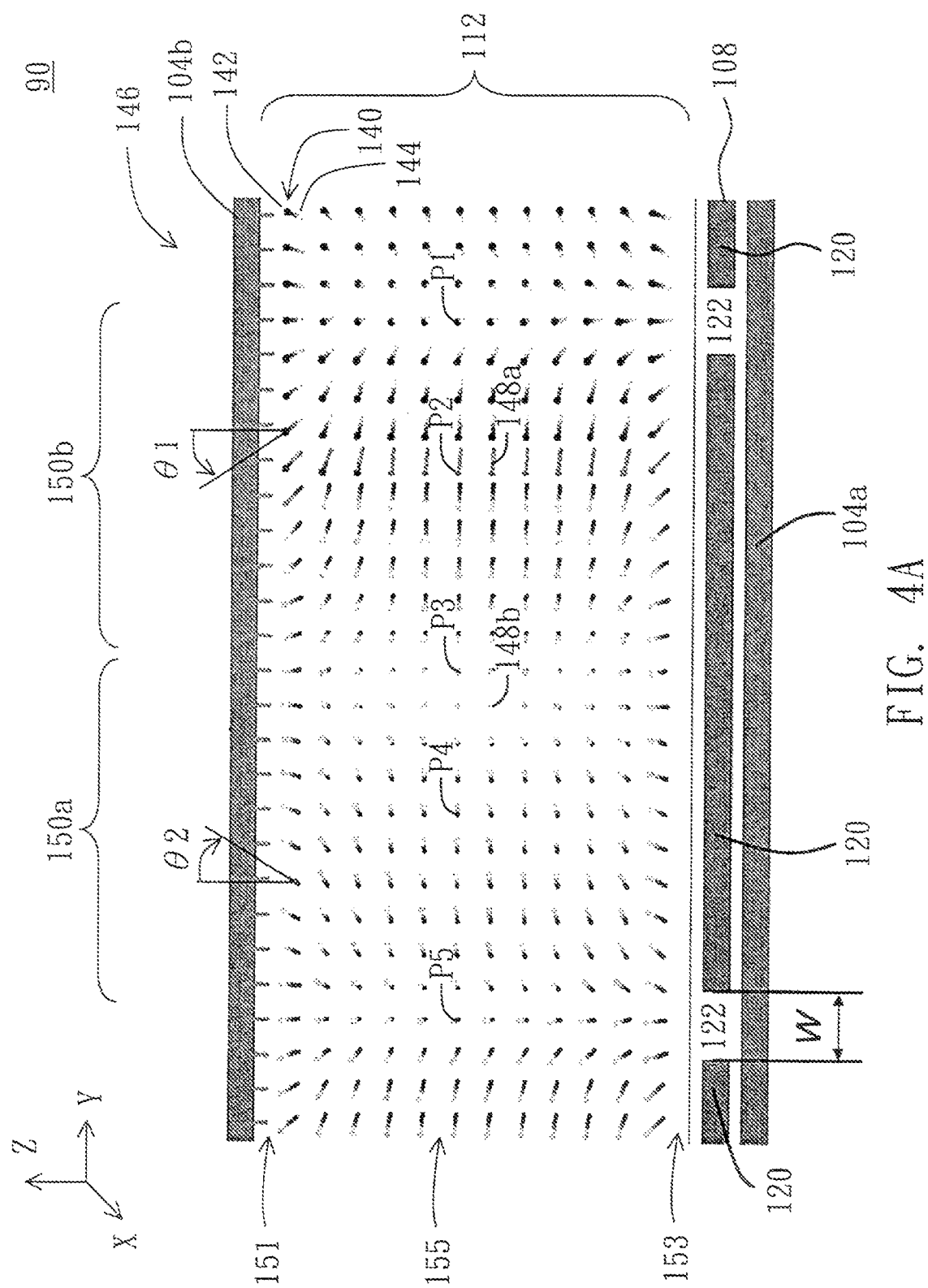
FIG. 4A is a diagram showing simulated orientations of liquid crystal molecules.

FIG. 4A is a diagram 146 showing an example of simulated orientations of liquid crystal molecules 113 in the liquid crystal layer 112 of a portion of the pixel 90 when the pixel 90 is operating in a bright state. The average orientations of liquid crystal molecules 113 in small localized regions are represented by unit vectors called liquid crystal directors 140. In FIG. 4A, each liquid crystal director 140 is represented by a head 142 and a tail 144.

In this example, a negative dielectric anisotropy liquid crystal material (MLC-6882 with $n_e$=1.582 and $n_o$=1.484, available from Merck, Germany) doped with a chiral material (CB15, available from Merck, Germany) is used in the liquid crystal layer 112. The first common electrode 104a and the second common electrode 104b are connected to ground voltage (0 V), and the patterned pixel electrode 108 is connected to a pixel voltage $V_{DATA}$=6V. The thickness of the liquid crystal layer 112 is 3.4 μm.

FIG. 4A shows a cross section of the pixel 90 along the Y-Z plane, with the positive x direction extending outwards out of the paper of FIG. 4A. The substrates 102a and 102b are parallel to the X-Y plane. The pixel electrode 108 has openings 122 each having a long rectangular shape, similar to those shown in FIG. 2C. The long sides of the rectangular openings 122 are parallel to the x-axis. The gap width W of the openings 122 is 2 μm.

The electric field causes the liquid crystal molecules 113 to form a continuous domain that has multiple regions, e.g., 150a and 150b, within the pixel 90. The liquid crystal directors 140 tilt in different directions in which the tilt angle (e.g., θ1 or θ2) vary continuously from one location to another. For example, the liquid crystal directors 140 closer to the top and bottom boundaries 151 and 153 of the liquid crystal layer 112 are tilted down less (e.g., angle θ1 or θ2 is smaller) relative to initial vertical alignment positions (parallel to the z-axis). The liquid crystal directors 140 closer to the middle portion 155 of the liquid crystal layer 112 are tilted down more (e.g., angle θ1 or θ2 is larger) relative to the initial vertical alignment positions.

The azimuthal angles of the liquid crystal directors 140 also vary continuously along a direction parallel to the X-Y plane, gradually rotating either clockwise or counter clockwise. Here, a director 140 having a head 142 that is darker than a tail 144 indicates that the head 142 is closer to the −x direction, and vice versa. To illustrate the rotation of the liquid crystal molecules 113 within each pixel 90, a director (e.g., 148a) more parallel to the Y-Z plane is shown to be longer than a director (e.g., 148b) that is more perpendicular to the Y-Z plane.

For example, moving from a location P1 to locations P2, P3, P4, and P5 (which are all located on the same X-Y plane) in sequence, the liquid crystal directors 140 rotate continuously from pointing approximately in the −x direction to the −y, +x, +y, and +x directions, respectively. The azimuth angles of the liquid crystal molecules vary continuously from one location to another within the pixel 90. The transition from one region (e.g., 150a) to another region (e.g., 150b) in the liquid crystal layer 112 is continuous.

The twist forces imparted by the chiral dopant assist in tilting down the liquid crystal molecules 113 from their initial vertical alignment positions (parallel to the z-axis) when a pixel voltage is applied to the pixel electrode 108. The liquid crystal molecules 113 at locations (e.g., P1 and P5) directly above the openings 122 are tilted relative to initial positions by amounts comparable to (or greater than half of) those at locations (e.g., P2, P3, and P4) above the conducting portions 120.

The type of material and concentration of the chiral dopant are selected such that the liquid crystal mixture (including the liquid crystal material and the chiral dopant) has a free pitch greater than 10 times the cell gap (thickness of the liquid crystal layer 112). For example, if the cell gap is 4.5 μm, the chiral dopant is selected such that the liquid crystal mixture has a free pitch of more than 4.5 μm×10=45 μm. In the example of FIG. 4A, the cell gap is 3.4 μm and the free pitch of the liquid crystal mixture is 1000 μm. The term "free pitch" refers to the pitch length of the twisted structures in the liquid crystal layer doped with the chiral material when no external force (or voltage) is applied to the liquid crystal layer, and only one substrate surface is coated with a rubbed homogeneous alignment layer while the other substrate surface is coated with an unrubbed homogeneous alignment layer. The free pitch decreases as the concentration of the chiral dopant increases.

Figure 4B:
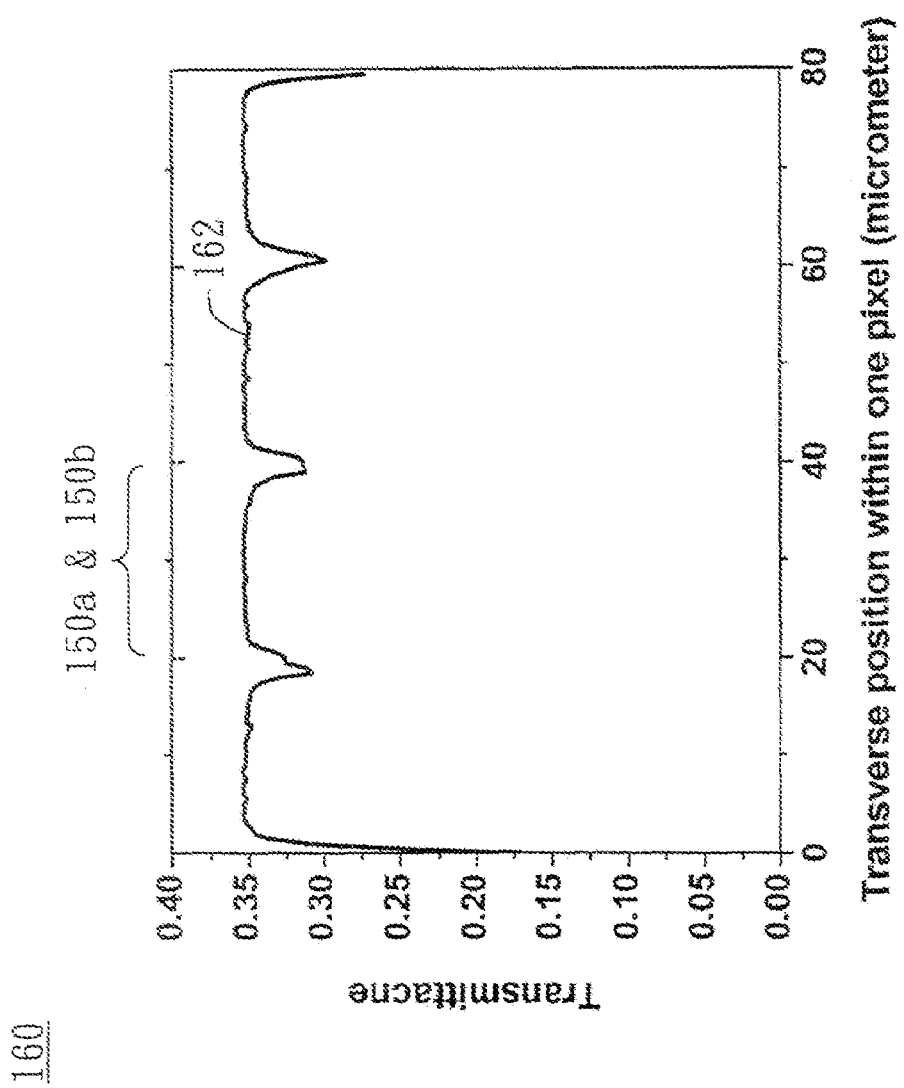
FIG. 4B is a graph showing the transmittance profile of a pixel.

FIG. 4B is a graph 160 showing the transmittance profile 162 of the pixel 90 based on the liquid crystal director profile of FIG. 4A. The transmittance is between about 30% to 35% across the pixel 90. The transmittance above the conducting area 120 is about 35%, and the transmittance above the openings 122 is about 30%. The transmittance values shown in FIG. 4B take into account the reduction in light caused by the phase retardation films 114a, 114b and linear polarizers 116a, 116b. When the transmittance values shown in FIG. 4B are normalized to the transmittance of two parallel linear polarizers, the overall light efficiency of the pixel 90 is about 97.5% (assuming that the substrates 102a, 102b, electrodes 104a, 104b, 108, alignment films 110a, 110b, and the planar layer 106 are completely transparent).

The graph 160 shows that the transmittance drops slightly in the regions above the openings 122. This is because the liquid crystal molecules 113 in regions above the openings 122 have tilt angles (the angle between the liquid crystal director direction and the z-axis) slightly smaller than those in regions above the conducting portions 120. The overall accumulated phase retardation by the liquid crystal layer 112 in the region above the opening 122 is slightly smaller than that in the region above the conducting portion 120. Thus, when circular polarizers are laminated on both sides of the display 100, the transmittances in the regions above the openings 122 are slightly lower than those in the regions above the conducting portion 120.

Figure 5A:
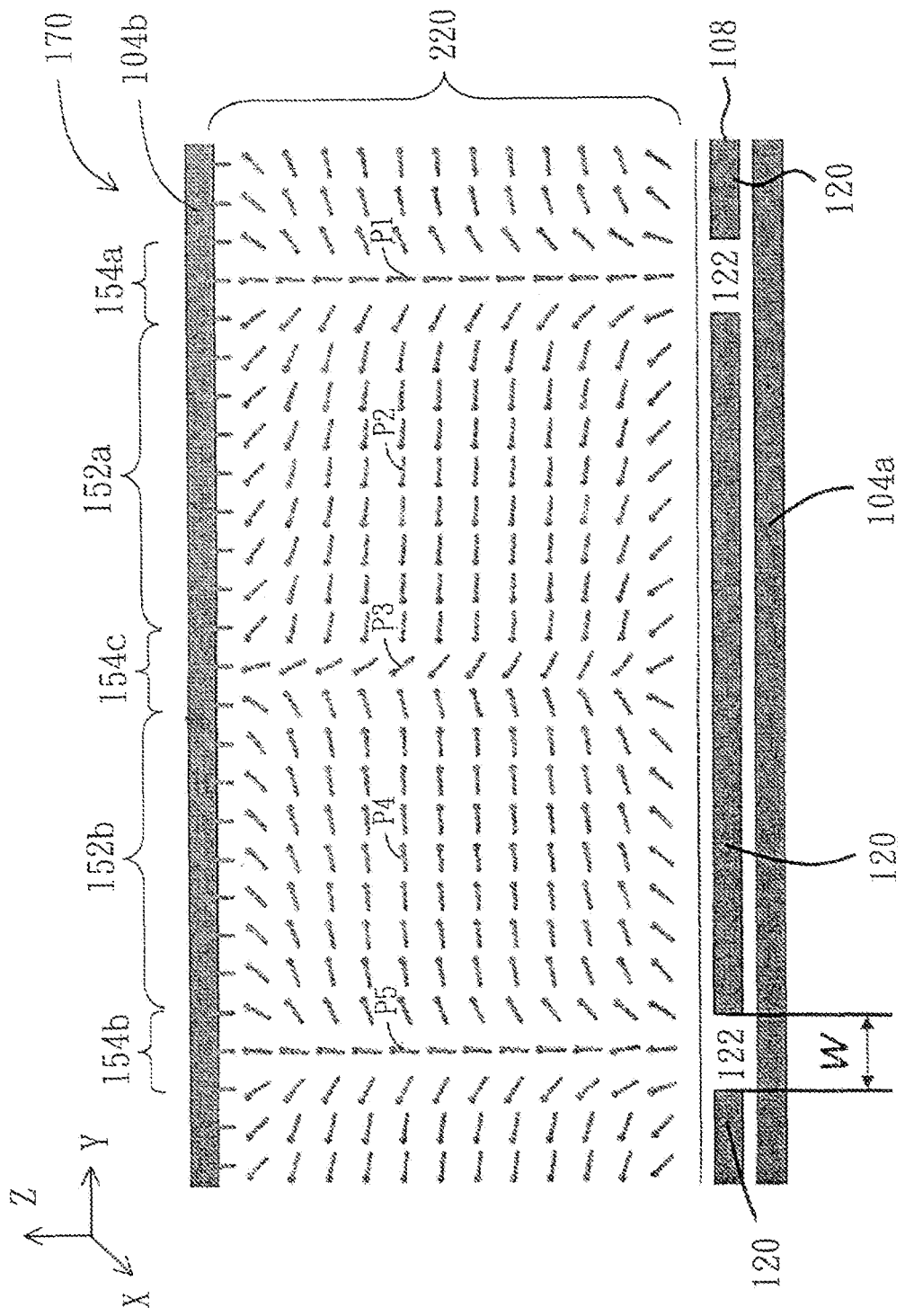
FIG. 5A is a diagram showing simulated orientations of liquid crystal molecules.

For comparison, FIG. 5A is a diagram 170 showing an example of simulated orientations of liquid crystal molecules in a liquid crystal layer 220 of a portion of a pixel in which the liquid crystal layer 220 does not include chiral dopants. The electric field causes multiple domains (e.g., 152a and 152b) to be formed in the liquid crystal layer 220. Because there is no chiral dopant, the liquid crystal molecules do not rotate significantly about the z-axis when moving from, e.g., location P1 to locations P2, P3, P4, and P5. Some of the liquid crystal molecules at the domain boundaries (e.g., 154a, 154b, and 154c) are not tilted and remain at their initial positions (aligned parallel to the z-axis). One possible reason for the liquid crystal molecules not tilting at the domain boundaries is that the electric field is symmetrically distributed at the domain boundaries, so the forces inducing the liquid crystal molecules to tilt in one direction (e.g., clockwise) is as strong as the forces inducing the molecules to tilt in an opposite direction (e.g., counter clockwise). The different forces acting on the liquid crystal molecules cancel each other, so the molecules do not tilt and remain at their initial positions.

Figure 5B:
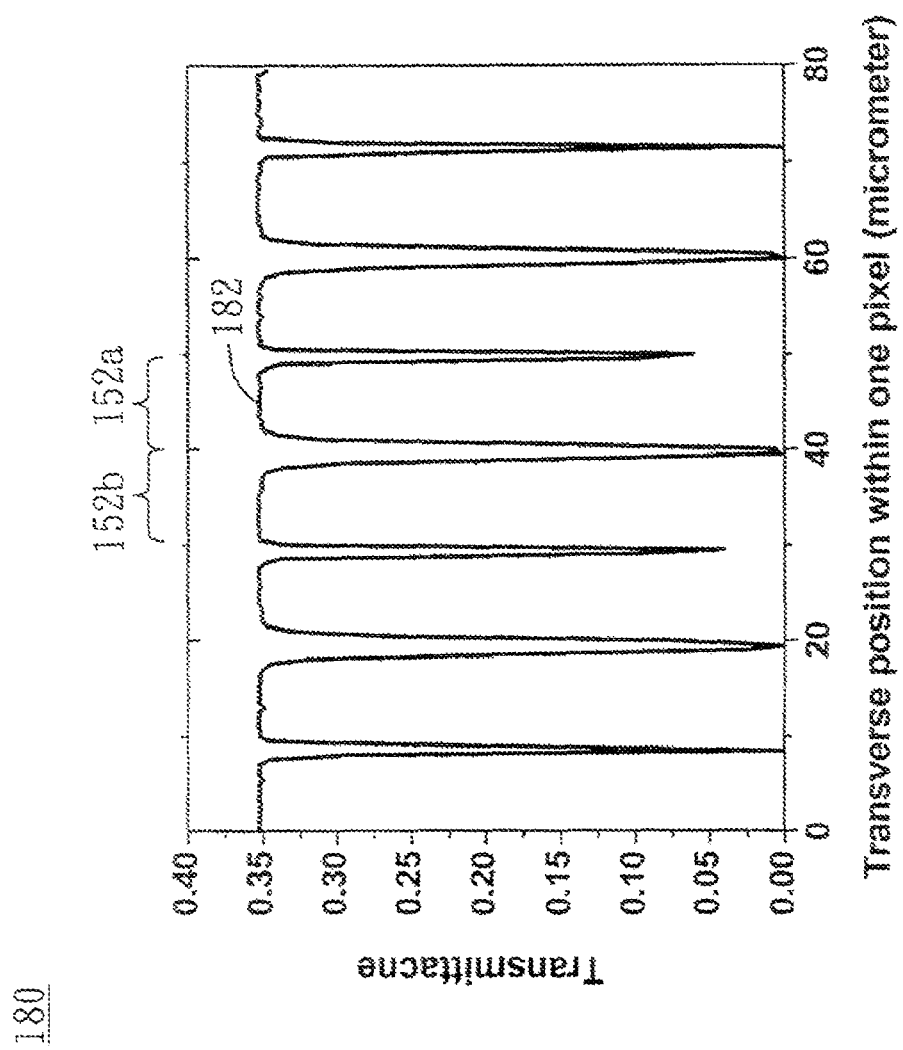
FIG. 5B is a graph showing the transmittance profile of a pixel.

FIG. 5B is a graph 180 showing the transmittance profile 182 of the pixel based on the liquid crystal director profile of FIG. 5A (in which the liquid crystal layer 220 does not include chiral dopants). The graph 180 shows the transmittance profile of the entire pixel in which the pixel width is 80 μm. At the domain boundaries above the openings 122, the liquid crystal molecules are not tilted, so the accumulated phase retardation is small. Therefore, the transmittances at the domain boundaries (e.g., 154a, 154b, 154c) are low, and the domain boundaries appear as dark lines. The transmittance profile 182 is obtained using circular polarizers on both sides of the liquid crystal panel. The overall light efficiency of the pixel in the example of FIG. 5B is around 88.7% when normalized to the transmittance of two parallel linear polarizers. This is lower than the light efficiency (97.5%) of the pixel 90 the example of FIG. 4B in which the liquid crystal layer 122 includes chiral dopants.

Figure 6A:
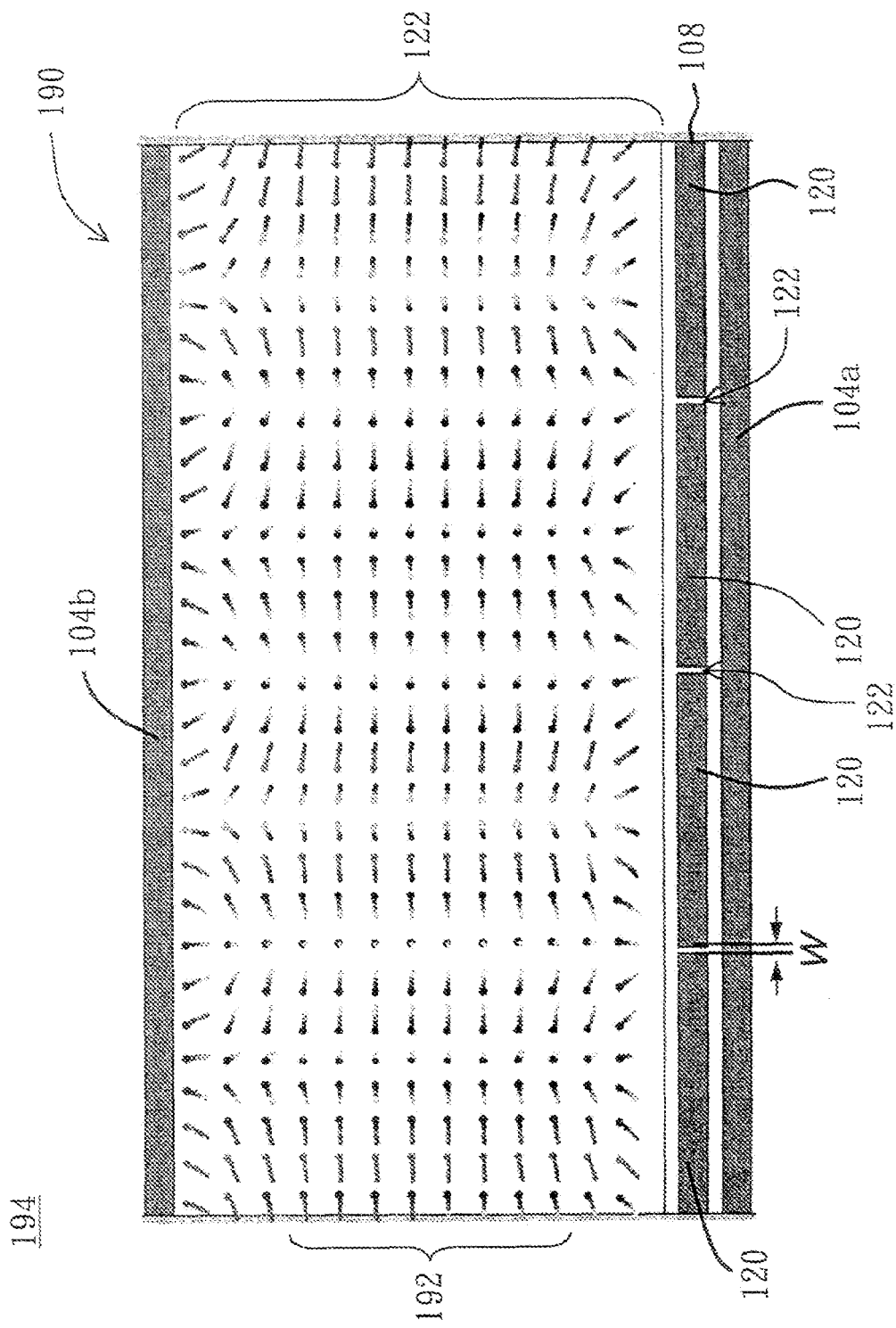
FIG. 6A is a diagram that shows simulated orientations of liquid crystal molecules.

FIG. 6A is a diagram 190 that shows an example of simulated orientations of liquid crystal molecules 113 in the liquid crystal layer 112 of a pixel 194 operating in a bright state. The pixel 194 used in the simulation of FIG. 6A is similar to the pixel 90 used in the simulation of FIG. 4A, except that the widths W of the openings 122 in the pixel 194 is smaller than the widths W of the openings 122 in the pixel 90. In the example of FIG. 6A, the width W is 0.5 μm (as compared to W=2 μm in FIG. 4A), the cell gap is 3.4 μm, and the free pitch of the liquid crystal mixture is 1000 μm.

When the widths of the openings 122 is reduced, the fringe fields (132 and 134 in FIG. 3) are stronger, causing the liquid crystal molecules 113 to tilt more at regions above the openings 122, increasing overall light efficiency of the pixel 194. In the diagram 190, in the bulk region 192 of the liquid crystal layer 122, almost all of liquid crystal molecules 113 are tilted and aligned along directions substantially parallel to the substrates 102a and 102b.

Figure 6B:
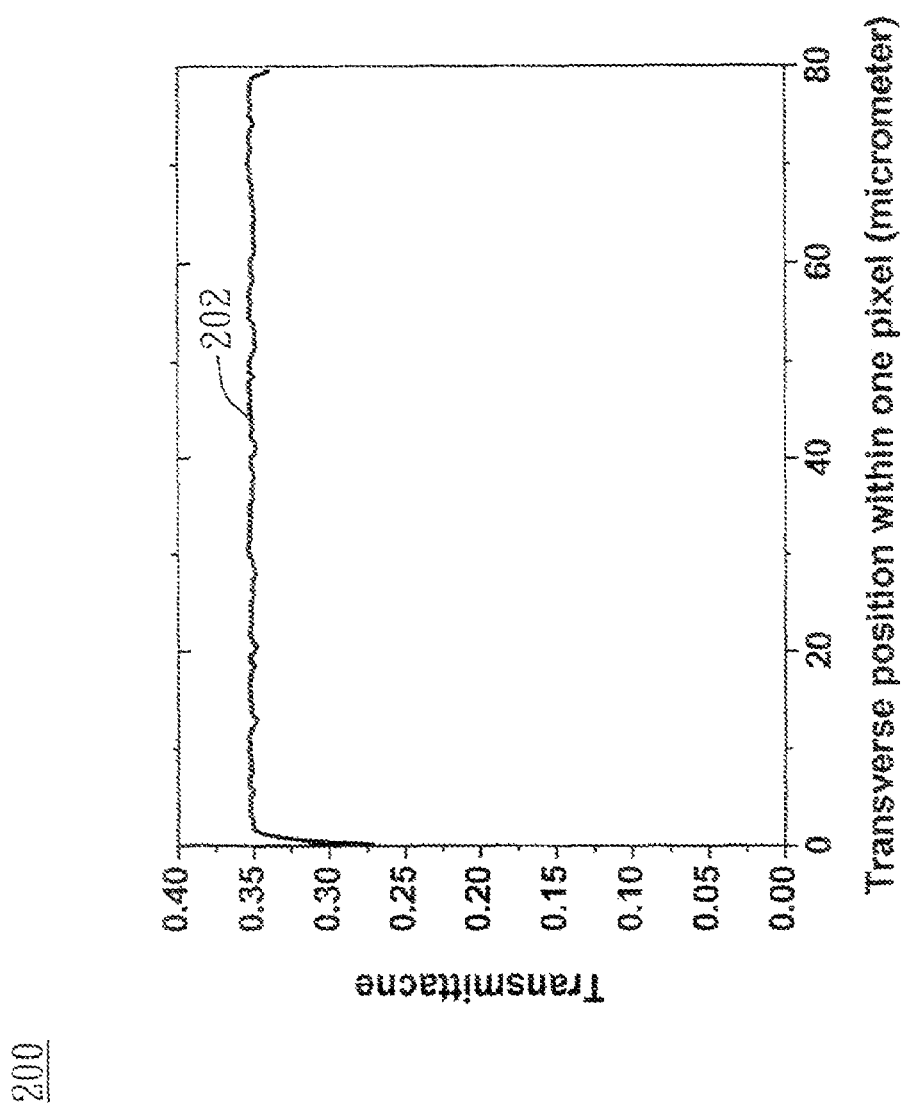
FIG. 6B is a graph showing the transmittance profile of a pixel.

FIG. 6B is a graph 200 showing the transmittance profile 202 of the pixel 194 based on the liquid crystal director profile of FIG. 6A. A substantially flat transmittance profile is achieved across the whole pixel 194. In this example, the light efficiency of the pixel 194 is more than 99.2% when normalized to the transmittance of two parallel linear polarizers.

Figure 7:
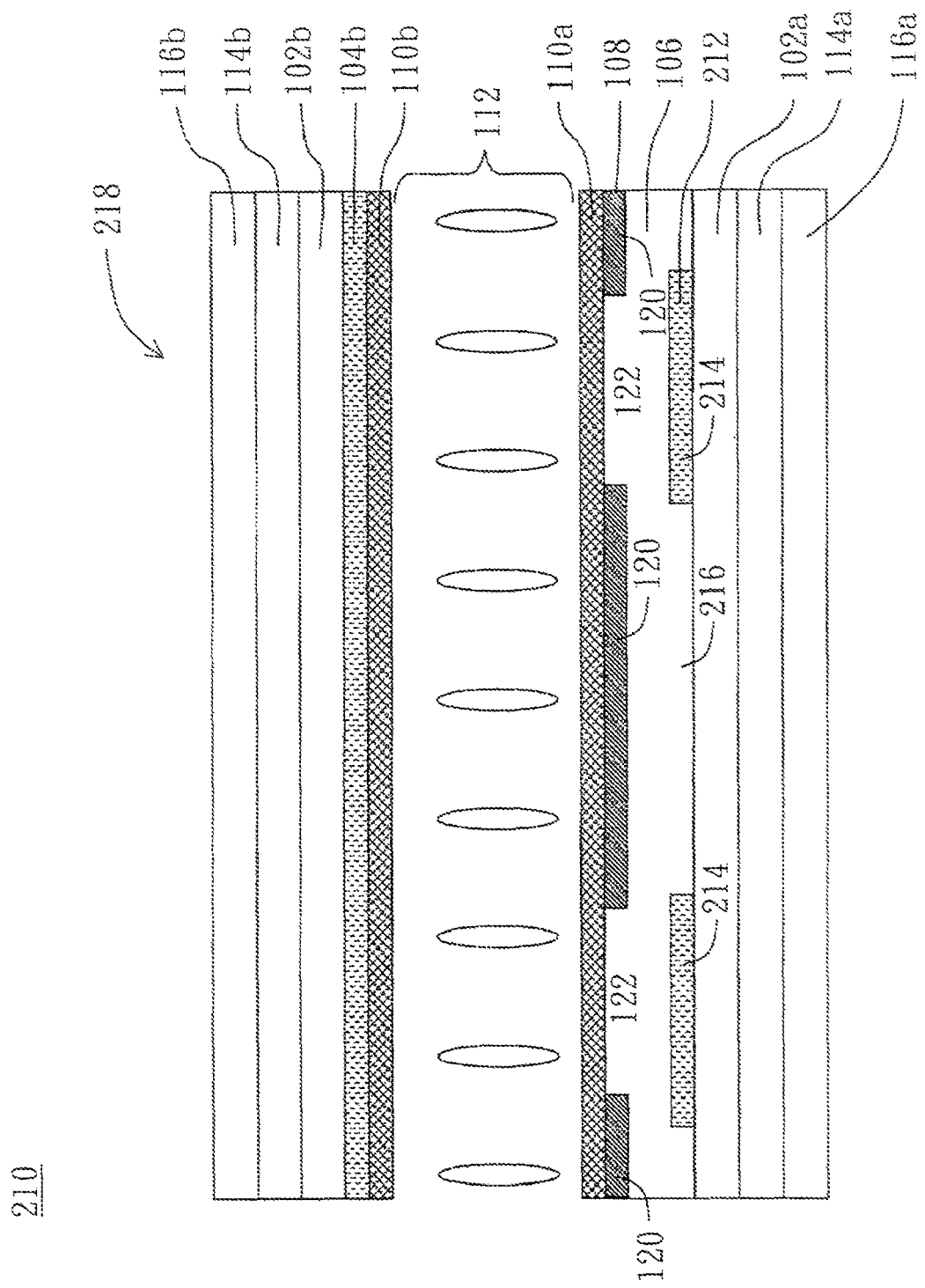
FIG. 7 is a cross-sectional diagram of a pixel.

FIG. 7 is a cross-sectional diagram of an example of a pixel 218 of a vertical alignment mode liquid crystal display 210 that includes a pixel electrode 108 having openings 122 and a liquid crystal layer 112 doped with a chiral material. The display 210 is similar to the display 100 of FIG. 1, except that the display 210 includes a patterned first common electrode 212 that has conductive portions 214 and openings 216. The conductive portions 214 have shapes that correspond to the shapes of the openings 122 of the pixel electrode 108. The widths of the conductive portions 214 are slightly larger than the widths of the openings 122.

Figure 8:
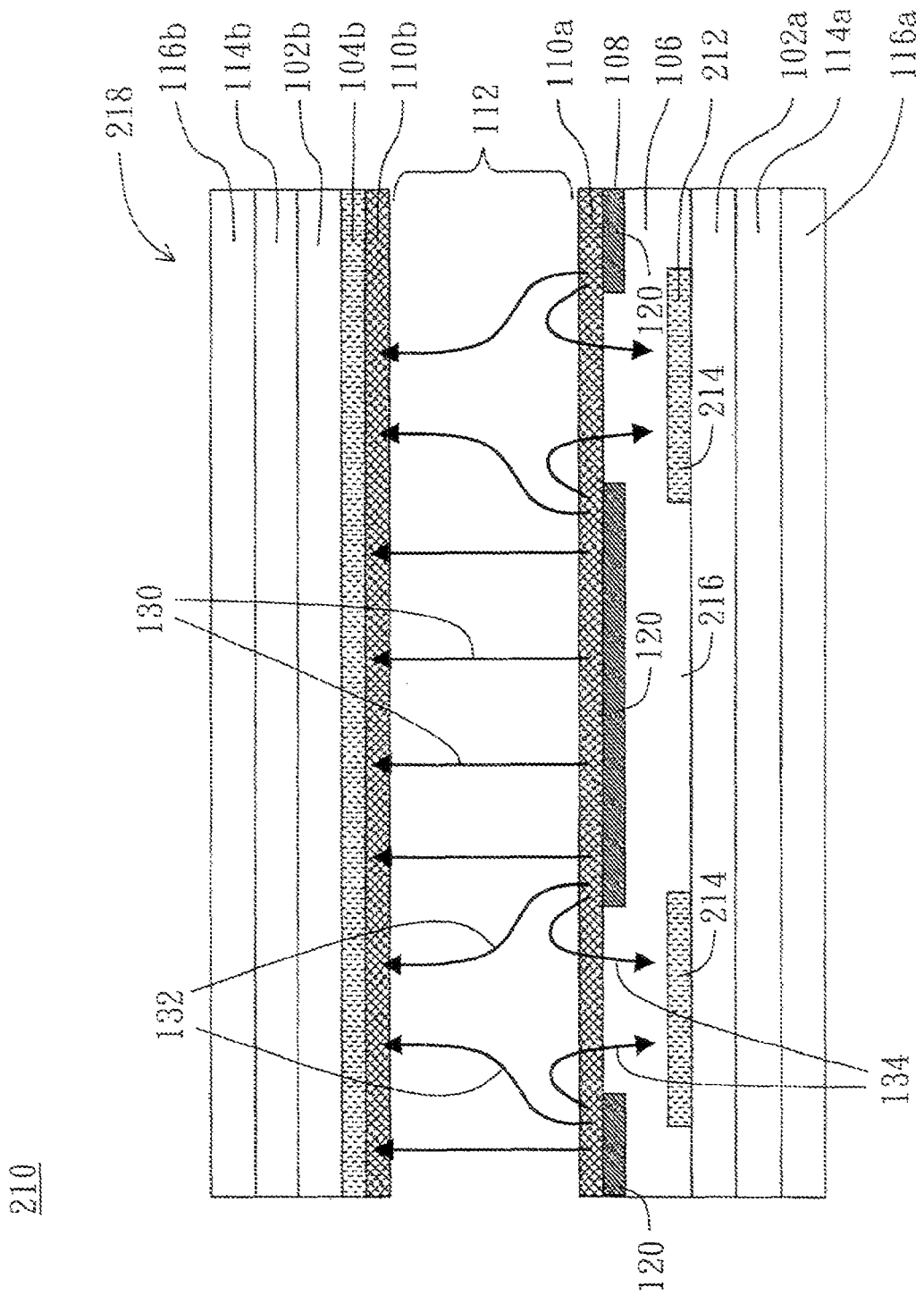
FIG. 8 is a cross-sectional diagram of a pixel, showing an electric field distribution at the pixel.

FIG. 8 is a cross-sectional diagram of the pixel 218, showing electric field lines at a voltage-on state. The electric field generated by the pixel electrode 108, the first common electrode 212, and the second common electrode 104b in FIG. 8 is similar to those shown in FIG. 3. This indicates that the openings 216 in the first common electrode 212 do not affect the tilting of the liquid crystal molecules 113 in the liquid crystal layer 112. The optical performance of the display 210 in FIG. 8 is similar to that of the display 100 in FIG. 1.

FIG. 9 is a schematic diagram of an example of the liquid crystal display 100, which includes an array 12 of pixels 90 that are controlled by one or more gate drivers 16 and one or more data drivers 18. Each pixel 90 includes one or more thin film transistors (TFT) 20, a storage capacitor $C_{ST}$ 22, and a liquid crystal cell 112 that has an effective capacitance represented by a capacitor $C_{LC}$ 24. The storage capacitor $C_{ST}$ 22 can be formed by the pixel electrode 108 and the first common electrode 104a. The capacitors $C_{ST}$ 22 and $C_{LC}$ 24 can be, e.g., connected in parallel to a first node 26 and a second node 28. The TFT 20 includes a gate 30 that is connected to a gate line 32, which is connected to the gate driver 16. When the gate driver 16 drives the gate line 32 to turn on the TFT 20, the data driver 18 drives a data line 34 with a voltage signal (e.g., $V_{DATA}$) that is passed to the capacitors $C_{ST}$ 22 and $C_{LC}$ 24.

In some examples, the first node 26 is connected to the pixel electrode 108 (FIG. 1), and the second node 28 is connected to the first and second common electrodes 104a, 104b. The voltage (e.g., $V_{DATA}$) across the capacitor $C_{ST}$ 22 determines the voltage applied to the liquid crystal cell 112. The voltage on the data line 34 is sometimes referred to as a "pixel voltage" or "gray scale voltage" because it determines the gray scale level shown by the pixel 90.

A number of embodiments of the invention have been described. Other implementations are also within the scope of the following claims. For example, the first common electrode 104a can be connected to a first reference voltage, and the second common electrode 104b can be connected to a second reference voltage. The first and second reference voltages do not necessarily have to be equal to the ground voltage. The first and second reference voltages can be the same or different. Additional passivation layers, alignment layers, and compensation films can be used in the displays described above. The components of the displays, such as the liquid crystal layer and the polarization films can use materials and have parameters different from those described above. The retardation values of the films can be different from those described above.

The orientations of the liquid crystal molecules described above refer to the directions of directors of the liquid crystal molecules. The molecules may tend to point more in one direction (represented by the director) over time than other directions. For example, the phrase "the liquid crystal molecules are substantially aligned along a direction normal to the substrates" means that the average direction of the directors of the liquid crystal molecules are generally aligned along the normal direction, but the individual molecules may point to different directions.

What is claimed is:

1. A display comprising:
    pixel circuits each comprising:
        a first electrode to be electrically coupled to a reference voltage;
        a second electrode to receive a pixel voltage corresponding to a gray scale level, the second electrode comprising a conducting layer having openings;
        a third electrode to be electrically coupled to the reference voltage, the second electrode being between the first and third electrodes, wherein the voltage level of the first electrode and the voltage level of the third electrode are the same; and
        a liquid crystal layer between the first and second electrodes, the liquid crystal layer comprising a negative dielectric type vertical alignment liquid crystal doped with a chiral material, wherein the chiral material is selected to cause the liquid crystal layer to form twisted structures each having a free pitch of at least ten times a thickness of the liquid crystal layer.

2. The display of claim 1 wherein the first and second reference voltages are equal to a ground voltage of the pixels.

3. The display of claim 1 wherein the first, second, and third electrodes and the chiral dopant are configured such that when the pixel voltage is applied to the second electrode, an electric field generated by the first, second, and third electrodes cause liquid crystal molecules above the openings to tilt by amounts that are more than half of those of the liquid crystal molecules above the conducting layer away from the openings, the amount of tilt being measured from initial positions of the molecules when the pixel voltage is below a threshold.

4. The display of claim 1 wherein when the pixel circuit is in a bright state, the transmissivity of portions of the pixel corresponding to the openings is at least half the transmissivity of portions of the pixel corresponding to the conducting layer away from the openings.

5. The display of claim 1 wherein when the pixel circuit is in a bright state, the transmissivity of portions of the pixel corresponding to the openings is at least 90% the transmissivity of portions of the pixel corresponding to the conducting layer away from the openings.

6. The display of claim 1 wherein the first, second, and third electrodes and the chiral dopant are configured such that azimuth angles of liquid crystal directors vary continuously across the pixel when the pixel voltage is applied to the second electrode.

7. The display of claim 1 wherein the liquid crystal layer comprises liquid crystal molecules that are aligned along a direction substantially normal to the surfaces of the first and second electrodes when the pixel voltage is below a threshold.

8. The display of claim 1 wherein the openings comprise circles having diameters in a range between 0.1 m to 8 m.

9. The display of claim 1 wherein the openings comprise elongated slits each having a width in a range between 0.1 μm to 8 μm.

10. The display of claim 9 wherein the elongated slits have at least one of straight, curved, and piecewise linear shapes.

11. The display of claim 1 wherein the third electrode comprises a continuous conducting layer without openings.

12. The display of claim 1 wherein the third electrode comprises a conducting layer having openings.

13. The display of claim 1 wherein the second and third electrodes are configured such that liquid crystal molecules adjacent to the openings are subject to electric fields having directions from the liquid crystal layer to the third electrode.

14. The display of claim 13 wherein the first, second, and third electrodes are configured such that liquid crystal molecules farther away from the openings are subject to electric fields having directions from the second electrode to the first electrode.

15. The display of claim 1 wherein each pixel comprises a storage capacitor having terminals comprising the second electrode and the third electrode.

16. The display of claim 1 wherein the first electrodes of different pixels are electrically connected.

17. The display of claim 1 wherein the third electrodes of different pixels are electrically connected.

18. The display of claim 1, further comprising a first circular polarizer and a second circular polarizer, the liquid crystal layer being between the first and second circular polarizers.

19. The display of claim 1, further comprising a first linear polarizer and a second linear polarizer, the liquid crystal layer being between the first and second linear polarizers.

20. A display comprising:
    a first substrate;
    a second substrate;
    pixel circuits between the first and second substrates, each pixel circuit comprising:
        a first electrode to be electrically coupled to a ground reference voltage;
        a second electrode to receive a pixel voltage corresponding to a gray scale level, the second electrode comprising a conducting layer having openings;

a third electrode to be electrically coupled to the ground reference voltage, the second electrode being between the first and third electrodes, wherein the voltage level of the first electrode and the voltage level of the third electrode are the same; and a liquid crystal layer between the first and second electrodes, the liquid crystal layer comprising a negative dielectric type vertical alignment liquid crystal doped with a chiral material, wherein the chiral material is selected to cause the liquid crystal layer to form twisted structures each having a free pitch of at least ten times a thickness of the liquid crystal layer;

a first alignment layer between the liquid crystal layer and the first electrode of each pixel circuit; and a second alignment layer between the liquid crystal layer and the second electrode of each pixel circuit.

21. A display comprising:

pixel circuits each comprising:

a first electrode to be electrically coupled to a first reference voltage;

a second electrode to receive a pixel voltage corresponding to a gray scale level, the second electrode comprising a conducting layer having openings;

a third electrode to be electrically coupled to a second reference voltage, the second electrode being between the first and third electrodes; and a liquid crystal layer between the first and second electrodes, the liquid crystal layer comprising a chiral material;

wherein the first, second, and third electrodes and the chiral dopant are configured such that when the pixel voltage is applied to the second electrode, an electric field generated by the first, second, and third electrodes cause liquid crystal molecules above the openings to tilt by amounts that are more than half of those of the liquid crystal molecules above the conducting layer away from the openings, the amount of tilt being measured from initial positions of the molecules when the pixel voltage is below a threshold.

22. A display comprising:

pixel circuits each comprising:

a first electrode to be electrically coupled to a first reference voltage;

a second electrode to receive a pixel voltage corresponding to a gray scale level, the second electrode comprising a conducting layer having openings;

a third electrode to be electrically coupled to a second reference voltage, the second electrode being between the first and third electrodes; and a liquid crystal layer between the first and second electrodes, the liquid crystal layer comprising a chiral material;

wherein when the pixel circuit is in a bright state, the transmissivity of portions of the pixel corresponding to the openings is at least 90% the transmissivity of portions of the pixel corresponding to the conducting layer away from the openings.

* * * * *